US009927892B2

United States Patent
Chen et al.

(10) Patent No.: US 9,927,892 B2
(45) Date of Patent: Mar. 27, 2018

(54) MULTIPLE TOUCH SELECTION CONTROL

(71) Applicant: International Business Machines Corporation, Armonk, NY (US)

(72) Inventors: Qi Chen, Shanghai (CN); Fang Liang Dong, Shanghai (CN); Chang Lei, Shanghai (CN); Xiao Xia Mao, Shanghai (CN); Wen Wen Yang, Shanghai (CN); Chao Zheng, Shanghai (CN); Jie Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 14/670,716

(22) Filed: Mar. 27, 2015

(65) Prior Publication Data

US 2016/0283205 A1   Sep. 29, 2016

(51) Int. Cl.
*G06F 3/041* (2006.01)
*G06F 3/0488* (2013.01)

(52) U.S. Cl.
CPC ........... *G06F 3/041* (2013.01); *G06F 3/0488* (2013.01); *G06F 2203/04104* (2013.01); *G06F 2203/04808* (2013.01)

(58) Field of Classification Search
USPC ............... 345/173, 157, 1.1, 619, 642, 650; 715/753, 751, 764, 765, 702, 767, 769, 715/771, 857; 463/30
See application file for complete search history.

(56) References Cited

U.S. PATENT DOCUMENTS

| 8,456,431 | B2 | 6/2013 | Victor | |
|---|---|---|---|---|
| 8,539,385 | B2 | 9/2013 | Capela et al. | |
| 2005/0183035 | A1* | 8/2005 | Ringel | G06F 3/0488 715/811 |
| 2007/0192749 | A1* | 8/2007 | Baudisch | G06F 3/0486 715/863 |
| 2010/0095233 | A1* | 4/2010 | Skourup | G05B 19/409 715/771 |
| 2011/0227947 | A1 | 9/2011 | Benko et al. | |
| 2013/0332876 | A1 | 12/2013 | Johnson et al. | |

(Continued)

FOREIGN PATENT DOCUMENTS

WO    2013173838 A2    11/2013

OTHER PUBLICATIONS

Lee, J. et al. "Believable Interaction with a Quasi-Tangible Tabletop Interface." Computer Animation and Virtual Worlds, vol. 18, No. 2, 2007, pp. 121-132. EBSCOhost.*

(Continued)

*Primary Examiner* — Doon Chow
*Assistant Examiner* — Wendy Nicholas
(74) *Attorney, Agent, or Firm* — Christopher McLane; Daniel R. Simek

(57) ABSTRACT

In an approach for managing a user interface a computer identifies a first user that is utilizing the user interface. The computer determines the identified first user is utilizing an aiming tool. The computer receives an input, the input including at least: an orientation of the aiming tool, wherein the orientation includes at least one of: a direction and a force to be applied upon release of the aiming tool. The computer calculates a trajectory from the aiming tool to a first location on the user interface based on the received input.

17 Claims, 4 Drawing Sheets

(56) References Cited

U.S. PATENT DOCUMENTS

| | | | |
|---|---|---|---|
| 2014/0096092 A1 | 4/2014 | Johnson | |
| 2014/0195987 A1* | 7/2014 | Tsudik | G06F 3/0484 715/863 |
| 2014/0354695 A1* | 12/2014 | Sakai | H04N 21/4312 345/650 |
| 2015/0007103 A1* | 1/2015 | Takahashi | G06F 3/04847 715/787 |
| 2015/0186011 A1* | 7/2015 | Clausen | G06F 3/04886 715/765 |
| 2016/0232745 A1* | 8/2016 | Antkowiak | G07F 17/3209 |

OTHER PUBLICATIONS

Wang, et al., "Large Screen Multi-Touch System Integrated With Multi-Projector", 2011 International Conference on Computer Science and Network Technology, © 2011 IEEE, pp. 455-458, Dec. 24-26, 2011, <http://ieeexplore.ieee.org/xpl/articleDetails.jsp?tp=&arnumber=6181996&queryTex%3Dposition+user++interface+objects+on+multi++touch+screens>.

* cited by examiner

MULTIPLE TOUCH SELECTION CONTROL

BACKGROUND OF THE INVENTION

The present invention relates generally to the field of electronic devices with touch-sensitive surfaces, and more particularly to controlling the interactions and selections associated with multiple users accessing a single electronic device with touch-sensitive surfaces.

Touch-sensitive surfaces (also known as touchscreens) are becoming commonplace in everything from mobile computing devices (e.g., personal computers, tablet computers, smartphones, etc.) to large display touchscreen interfaces (e.g., touch walls). Touchscreens are electronic visual displays that allow a user to control and manipulate computer programs by touching the screen with a special stylus and/or a finger. The development of multi-touch interaction techniques (i.e., the ability of a touch-sensitive surface to recognize the presence of more than one or more than two different points of contact with the touch-sensitive surface) furthers the capabilities of touchscreens. Multi-touch enabled touchscreens allow the utilization of more complex gestures (e.g., pinch, zoom, etc.) and for multiple users to interact with the touchscreen simultaneously.

Multi-touch interaction techniques can be implemented in several different ways, depending on the size and type of interface. Two common multi-touch techniques are capacitive and optical. Capacitive touchscreens (e.g., smart phones, tablet computers, etc.) monitor changes in electrical currents running through the touchscreen through a layer of capacitive or electricity-storing material in which the capacitors are arranged according to a coordinate system that creates a coordinate grid. Optical touchscreens (e.g., touch wall, touch tables, etc.) project an image through acrylic or glass and then back-light the image with light emitting diodes (LEDs) also creating a coordinate grid but utilize sensors and cameras to capture the scattering of light and reflections. In both techniques, when contact with the touchscreen occurs, a disruption is registered within the coordinate grid along with the gesture, which is then sent to the software and processed. As every individual point of the coordinate grid generates a signal when touched, capacitive and optical touchscreen devices are capable of recognizing multiple points of contact and multiple users.

The grid in a two-dimensional system, such as in the touchscreen, is a Cartesian coordinate system (e.g., rectangular coordinate system, x-y coordinate system). The Cartesian coordinate system specifies each point uniquely in a plane by a pair of numerical coordinates referred to as an ordered pair. The ordered pair is a signed distance, measured in the same unit length, from the origin point which is identified by the intersection of two fixed perpendicular reference lines known as the x-axis and y-axis. By applying the Cartesian coordinate system to the touchscreen, a unique (x, y) coordinate value is associated with each point of the surface, thus allowing the determination of a location corresponding to the perceived interaction. The locations are also associated with the known location of the displayed application software. By combining the location and interpreting the gestures, appropriate responses are displayed.

SUMMARY

Aspects of the present invention disclose a method, computer program product, and system for managing a user interface. The method includes one or more computer processors identifying a first user that is utilizing the user interface. The method further includes one or more computer processors determining the identified first user is utilizing an aiming tool. The method further includes one or more computer processors receiving an input, the input including at least: an orientation of the aiming tool, wherein the orientation includes at least one of: a direction and a force to be applied upon release of the aiming tool. The method further includes one or more computer processors calculating a trajectory from the aiming tool to a first location on the user interface based on the received input.

DETAILED DESCRIPTION

Touch walls and touch tables are large scale touchscreen devices (e.g., multiple touch-sensitive computing device) which vary in form and size based upon the intent of the owners and users. For example, in a conference center, a touch wall may be the size of a billboard and/or stage area, allowing a large number of users to interact with and view the touch wall from various distances. However, the touch wall in a classroom may be the size of a blackboard where the viewing distance and number of users is less. Touch walls and touch tables are designed to engage multiple users simultaneously, thus allowing a large number of individual users to utilize gestures and different content independently without interfering with one another. Embodiments of the present invention recognize that, due to the size of some touch walls and touch tables, users may be unable to select and/or interact with some user interface objects without necessitating the movement of the individual user to a different position and disrupting other users. Embodiments of the present invention also recognize that in a multiple user environment more than one user may select to interact with a user interface object, but individual user utilization is not clearly identified, which may result in incorporating duplicate changes.

Figure 1:
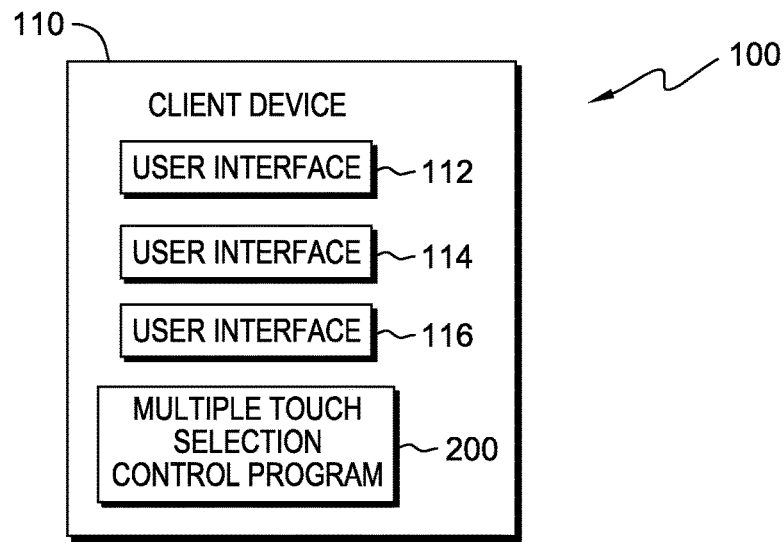
FIG. 1 is a functional block diagram illustrating a touch-sensitive computing environment, in accordance with an embodiment of the present invention.

The present invention will now be described in detail with reference to the Figures. FIG. 1 is a functional block diagram illustrating a touch-sensitive computing environment, generally designated 100, in accordance with one embodiment of the present invention. FIG. 1 provides only an illustration of one embodiment and does not imply any limitations with regard to the environments in which different embodiments may be implemented.

In the depicted embodiment, touch-sensitive computing environment 100 includes client device 110. Touch-sensitive computing environment 100 may include additional computing devices, mobile computing devices, servers, computers, storage devices, or other devices connected over a network that are not shown.

Client device 110 may be a web server or any other electronic device or computing system capable of processing program instructions and receiving and sending data. In the depicted embodiment, client device 110 represents a large scale multiple touch-sensitive computing device, such as a touch wall capable of interacting with multiple users at one time through multiple user interfaces. In some embodiments, client device 110 may be a laptop computer, a tablet computer, a netbook computer, a personal computer (PC), a desktop computer, a personal digital assistant (PDA), a smart phone, or any programmable electronic device capable of communicating with a network (not shown). In other embodiments, client device 110 may represent a server computing system utilizing multiple computers as a server system, such as in a cloud computing environment. In general, client device 110 is representative of any electronic device or combination of electronic devices capable of executing machine readable program instructions as described in greater detail with regard to FIG. 4, in accordance with embodiments of the present invention. Client device 110 contains user interfaces 112, 114, and 116, and multiple touch selection control program 200.

User interfaces 112, 114, and 116 are programs that provide an interface between multiple users of client device 110 and a plurality of applications that reside on client device 110 (e.g., operates on a touch wall and or a touch table). User interfaces 112, 114, and 116 are associated with individual users accessing client device 110 and are assigned a user workspace that includes an aiming tool. In the depicted embodiment, only user interfaces 112, 114, and 116 are shown; however, additional user interfaces may be included that are not shown. A user interface, such as user interfaces 112, 114, and 116, refers to the information (e.g., graphic, text, sound) that a program presents to a user and the control sequences the user employs to control the program. A variety of types of user interfaces exist. In one embodiment, user interfaces 112, 114, and 116 are graphical user interfaces. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interfaces 112, 114, and 116 send and receive information to multiple touch selection control program 200.

Multiple touch selection control program 200 is a user interface enhancement program that provides multiple users with the ability to create, select, access, and update information on client device 110 where the information may not reside within the immediate vicinity of the individual users. For example, client device 110 is a touch wall that covers a space of twenty feet wide by ten feet tall. A user may be working with information in the lower left most quadrant of the touch wall but needs to access information on the upper right most quadrant of the touch wall that is almost twenty feet away. Multiple touch selection control program 200 provides the user in the lower left most quadrant an aiming tool to select and access the information in the upper right quadrant without moving from the current physical location of the user. Multiple touch selection control program 200 utilizes the aiming tool to identify user interface objects displayed on client device 110 for further actions by a user. Multiple touch selection control program 200 also marks the identified user interface objects in a manner that is viewable by other users of client device 110. In the depicted embodiment, multiple touch selection control program 200 resides on client device 110. In another embodiment, multiple touch selection control program 200 may reside on a server or computing device connected over a network (not shown) provided multiple touch selection control program 200 is accessible by user interfaces 112, 114, and 116.

Figure 2:
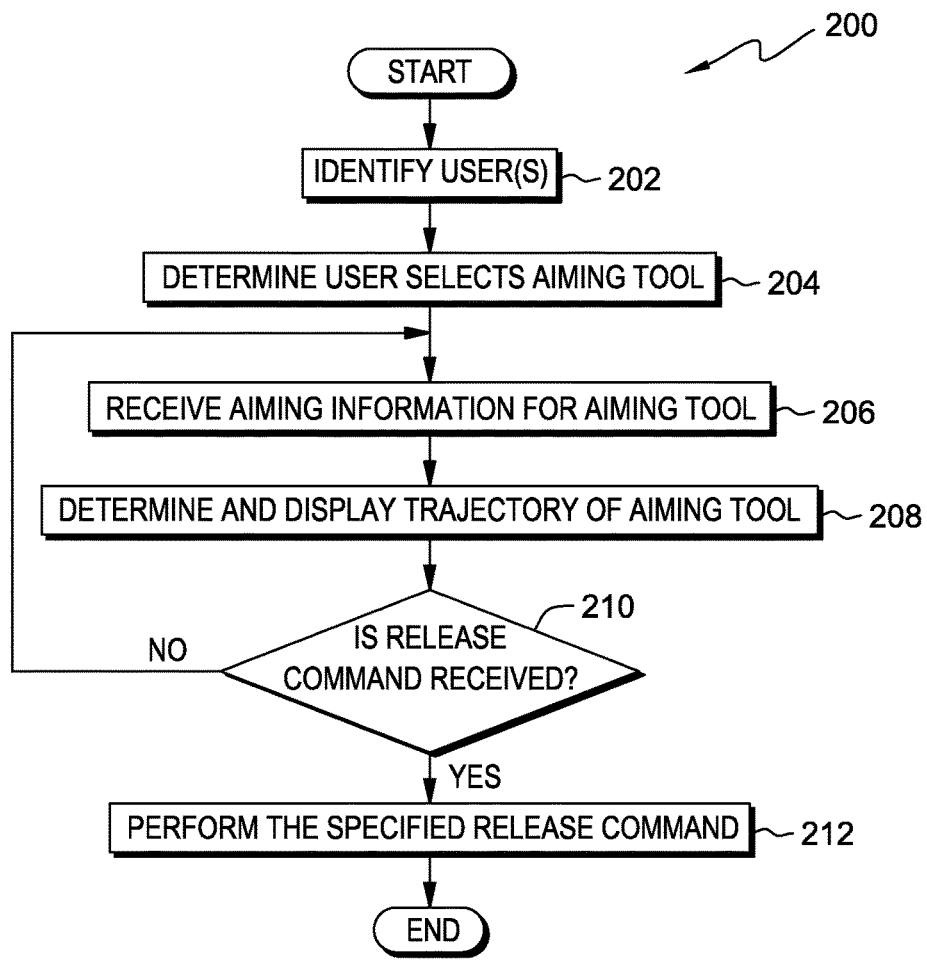
FIG. 2 is a flowchart depicting operational steps of a multiple touch selection control program, on a client device within the touch-sensitive computing environment of FIG. 1, for controlling the selection and transfer of information by multiple users, in accordance with an embodiment of the present invention.
Figure 3A:
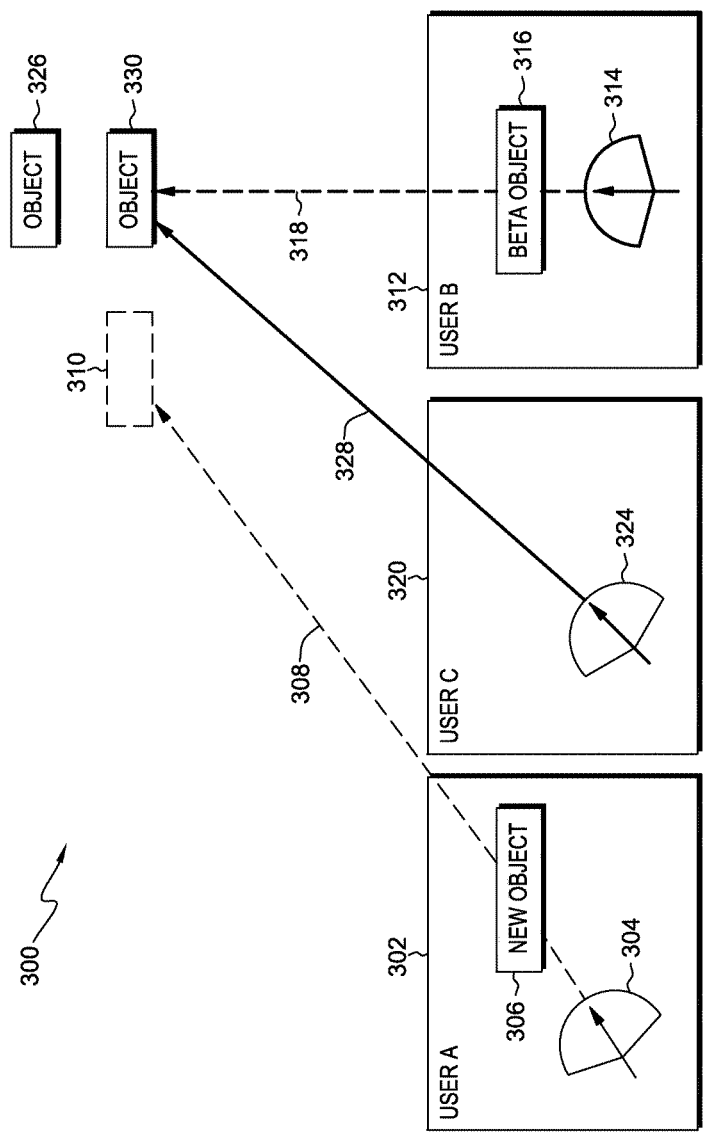
FIG. 3A depicts an example of a multiple touch-sensitive computing device, displaying selections and trajectory to add a new object and to update an existing object for two different users, in accordance with an embodiment of the present invention.
Figure 3B:
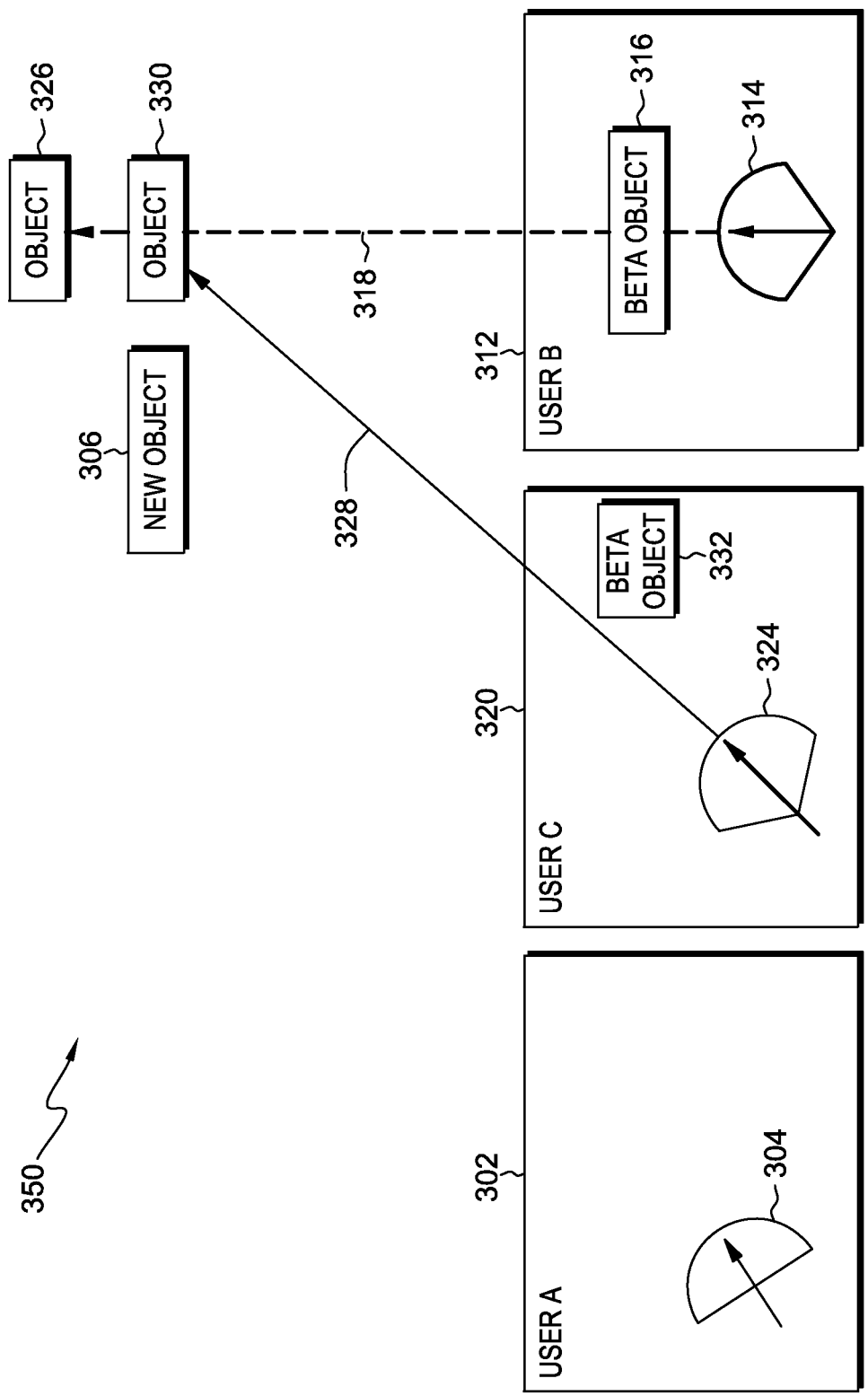
FIG. 3B depicts an example of a multiple touch-sensitive computing device, displaying the delivery of the new object and altering the trajectory of the selection to another existing object for two different users, in accordance with an embodiment of the present invention.

FIG. 2 is a flowchart depicting operational steps of multiple touch selection control program 200, a program for controlling the selection and transfer of information by multiple users, in accordance with an embodiment of the present invention. In one embodiment, multiple touch selection control program 200 is initiated at the time of startup of client device 110. In another embodiment, multiple touch selection control program 200 is initiated in response to a user request to enable multiple touch selection control program 200. FIG. 3A depicts example multiple touch-sensitive computing device 300, including a first set of selections utilizing multiple touch selection control program 200. FIG. 3B depicts example multiple touch-sensitive computing device 350 that incorporates updated selections that correspond to the depicted selections of FIG. 3A made during a subsequent utilization of multiple touch selection control program 200.

In step 202, multiple touch selection control program 200 identifies a user and provides each user with a workspace. Multiple touch selection control program 200 detects a disruption in the touch-sensitive surface of client device 110. Multiple touch selection control program 200 interprets the disruption to be a user accessing client device 110. In one embodiment, multiple touch selection control program 200 prompts the user to identify the number of users that will be interacting with client device 110. In another embodiment, multiple touch selection control program 200 determines users based on recognizing touch attributes associated with the users when interacting with client device 110. In some other embodiment, multiple touch selection control program 200 identifies users based on processing captured images through a digital camera (e.g., image processing identifies individuals within the captured image through facial recognition). In yet some other embodiment, multiple touch selection control program 200 determines a user based on a disruption in the touch-sensitive surface and a location relative to other identified disruptions.

Based on the number of identified users, multiple touch selection control program 200 creates one or more user interfaces (e.g., user interface 112 and user interface 114) that are associated with a workspace and an aiming tool. As depicted in the example of FIG. 3A and FIG. 3B, multiple touch selection control program 200 identifies three users and assigns user A workspace 302, user B workspace 312, and user C workspace 320. Assigning workspaces to users defines an area of the touch wall of client device 110 for the three individual users to perform work within without overlapping the workspace associated with the other users (e.g., each workspace is dedicated a specific individual user). User A workspace 302, user B workspace 312, and user C workspace 320 include aiming tools 304, 314, and 324 respectively. The user workspace is a portion of the specified area of the entire space covered by client device 110 that multiple touch selection control program 200 defines for individual users to perform work within. The aiming tool is a user interface object (e.g., bow and arrow, sling shot, golf club and ball, etc.) that multiple touch selection control program 200 displays that is capable of receiving input in order to select and perform actions with a user interface object that is not within the vicinity of the user. Multiple touch selection control program 200 assigns different formats (e.g., varying colors, line styles, widths, etc.) for each individual workspace to uniquely identify aiming tools to other users.

In step 204, multiple touch selection control program 200 determines the user selects the aiming tool (e.g., aiming tools 304, 314, and 324). Multiple touch selection control program 200 receives a set of x and y coordinates when the user, through user interface 112, interacts with the touchscreen of client device 110. Multiple touch selection control program 200 then correlates the received x and y coordinates with a coordinate map of a GUI interface that includes user interface objects (e.g., aiming tools 304, 314, and 324, objects 326 and 330, etc.). Multiple touch selection control program 200 determines aiming tool 304, aiming tool 314, and/or aiming tool 324 are selected when the received coordinates match the coordinates associated with aiming tool 304, aiming tool 314, and/or aiming tool 324 from the coordinate map of the GUI interface. In one embodiment, multiple touch selection control program 200 automatically displays a preliminary trajectory line at the time of selection of the aiming tool. In another embodiment, multiple touch selection control program 200 does not display a preliminary trajectory line until aiming information is received. The trajectory line depicts the calculated trajectory the aiming tool would traverse to reach a selected destination user interface object.

In step 206, multiple touch selection control program 200 receives aiming information for the aiming tool (e.g., aiming tool 304, aiming tool 314, and aiming tool 324). The aiming information includes two components, directional information and a force that may be received separately as user input through a user interface, such as user interface 112, user interface 114, and/or user interface 116. Multiple selection control program 200 receives directional information for the aiming tool. In one embodiment, multiple touch selection control program 200 may receive a change in orientation for the aiming tool. For example, initially when aiming tool 304 is not selected, aiming tool 304 is oriented in a vertical position (e.g. in aiming tool 304, the arrow and curved part of the bow point to the perceived top of client device 110). When a user selects aiming tool 304, multiple touch selection control program 200 receives finger gestures (e.g., rotation) from the user through user interface 112. Multiple touch selection control program 200 then rotates the depiction of aiming tool 304 following the path of the finger gesture and stops at a forty-five degree angle. Multiple touch selection control program 200 determines aiming tool 304 is potentially aiming at new object 306, blank space 310, or object 330. In some other embodiment, the orientation of the aiming tool does not need to be changed, and the aiming tool remains in the current displayed position (e.g., aiming tool 314 is already orientated towards the object to be selected).

Multiple touch selection control program 200 then receives aiming information associated with an amount of force to apply to aiming tool 304. In one embodiment, multiple touch selection control program 200 receives the amount of force by interpreting a gesture for the deformation of aiming tool 304. For example, when no forces are applied to the string of a bow, the string remains taut, and multiple touch selection control program 200 depicts a straight line representing the string. In response to the user selecting the string and pulling a finger back away from the curved bow, multiple touch selection control program 200 interprets the gesture as a force being exerted on the string. Multiple touch selection control program 200 calculates a force based on the traversed distance between the start and the end points by utilizing values that multiple touch selection control program 200 determines from the underlying coordinate grid of the touchscreen. In another embodiment, multiple touch selection control program 200 receives the amount of force by interpreting the number of finger taps associated with the aiming tool. For example, a single tap would indicate a minimal force, and three taps would indicate a larger force (i.e., the amount of force and deformation would increase proportional to the number of taps). In some other embodiment, multiple touch selection control program 200 receives the amount of force from a selection from a list of options (e.g., available user interface objects, numerical force values, verbal force description, etc.). Multiple touch selection control program 200 then displays a deformation of the string of the aiming tool proportional to the received force.

In step 208, multiple touch selection control program 200 determines and displays the trajectory of the aiming tool. In one embodiment, multiple touch selection control program 200 combines the directional information and the received amount of force and determines the trajectory the aiming tool will take when released. Multiple touch selection control program 200 then displays the trajectory line. As depicted in the example of FIG. 3A, aiming tool 304 is oriented at approximately a forty-five degree angle and includes minimal deformation to the string of the bow. Multiple touch selection control program 200 calculates a trajectory (e.g., utilizing received aiming information from step 206) and displays trajectory line 308. Trajectory line 308 points to blank space 310, as the deformation on aiming tool 304 was minimal (i.e., multiple touch selection control program 200 calculates the received force would not reach object 326). In another embodiment, multiple touch selection control program 200 determines the trajectory based on the directional information and initially selects the first user interface object in the projected trajectory (i.e., does not use a received force to calculate distance). As depicted in the example of FIG. 3A, aiming tool 314 is oriented at a ninety degree angle, and while object 326 and object 330 are both on the same trajectory, multiple touch selection control program 200 selects the first object encountered, and trajectory line 318 points to object 330.

In another embodiment, multiple touch selection control program 200 receives an adjustment to the initial aiming information after the user reviews the display on client device 110 depicting the initial trajectory line and destination selection. In one embodiment, multiple touch selection control program 200 receives an adjustment to the directional information. In another embodiment, multiple touch selection control program 200 receives an adjustment to the amount of force. In some other embodiment, multiple touch selection control program 200 receives an adjustment to both the directional information and amount of force. Upon receipt of the adjustment, multiple touch selection control program 200 recalculates the trajectory and updates the display of client device 110 with a revision to the trajectory line. As depicted in the example of FIG. 3A, the trajectory of aiming tool 314 as shown by trajectory line 318 selecting object 330; however, the user of user B workspace 312 wants to select object 326 instead. Through user interface 114, the user reselects aiming tool 314 and adjusts the deformation to be greater (e.g., increases force information) than before as depicted in FIG. 3B by the increased angle. Multiple touch selection control program 200 receives the updated force information and recalculates a trajectory. Multiple touch selection control program 200 displays an update to trajectory line 318, and trajectory line 318 now points at object 326 instead of object 330.

In decision 210, multiple touch selection control program 200 determines whether a release command is received. Multiple touch selection control program 200 monitors the gestures of the user through user interface 112 (e.g., user interface 114 and/or user interface 116). In one embodiment, multiple touch selection control program 200 receives release command gestures associated with aiming tool 304, aiming tool 314, and/or aiming tool 324 (i.e., update to the aiming information). In another embodiment, multiple touch selection control program 200 receives a predefined release command gesture associated with a specific action. For example, a tap on the deformation, forward motion finger swipe starting at the deformation moving in the direction of object 330, or interacting with trajectory line 308, can be a command to release the aiming tool. In another embodiment, multiple touch selection control program 200 receives a predefined release command gesture and multiple touch selection control program 200 then displays a list of release options (e.g., add new object, merge objects, edit object, cancel, delete, etc.) for the user to select from prior to completing the release. In some other embodiment, multiple touch selection control program 200 does not receive either a release command gesture or an update to the aiming information (e.g., user continues to perform work in workspace 302). Multiple touch selection control program 200 continues to monitor the gestures until multiple touch selection control program 200 receives either a release command gesture or an update to the aiming information.

If multiple touch selection control program 200 determines the release command is not received (decision 210, no branch), but changes are made to the aiming information (e.g., changes occur to aiming tool 304, aiming tool 314, and/or aiming tool 324), then multiple touch selection control program 200 receives aiming information for the aiming tool (step 206). If multiple touch selection control program 200 determines the release command is received (decision 210, yes branch), then multiple touch selection control program 200 performs the specified release command (step 212). If multiple touch selection control program 200 determines neither release command gestures nor aiming information are received, then multiple touch selection control program 200 continues to monitor for aiming information changes (step 206) or to receive a release command (decision 210).

In step 212, multiple touch selection control program 200 performs the specified release command. In one embodiment, multiple touch selection control program 200 performs a release command associated with adding a new object. As depicted in the example of FIG. 3A, within user A workspace 302, aiming tool 304 and trajectory line 308 pass through new object 306, pointing within the GUI to the selected destination of blank space 310. The user indicates through a release command gesture and/or selection to add new object 306 to the GUI at blank space 310. In response to the received release command gesture as depicted in the example of FIG. 3B, multiple touch selection control program 200 moves new object 306 from user A workspace 302 to blank space 310. Multiple touch selection control program 200 then returns aiming tool 304 to an unselected state (e.g., line representing the string of the bow is no longer deformed).

In another embodiment, multiple touch selection control program 200 performs a release command associated with merging a beta version with an existing object. The beta version is a copy of the selected object, which is created within the user workspace that the user modifies. As depicted in the example of FIG. 3B, aiming tool 314 passes through beta object 316 pointing within the GUI to the selected destination of object 326. Upon receipt of the release command associated with aiming tool 314, multiple touch selection control program 200 sends beta object 316 to object 326. Beta object 316 then merges with the prior version of object 326 and creates a new version of object 326. In one embodiment, when the release command is a merge and exit, multiple touch selection control program 200 removes beta object 316 from user B workspace 312, removes trajectory line 318, and returns aiming tool 314 to an unselected state. In another embodiment when the release command is only to merge without exiting, multiple touch selection control program 200 continues to display beta object 316 and trajectory line 318 but returns aiming tool 314 to an unselected state.

In some other embodiment, multiple touch selection control program 200 performs a release command associated with editing a user interface object. At the time of release, multiple touch selection control program 200 determines whether the selected user interface object is in use by another user. In one embodiment, multiple touch selection control program 200 determines the user interface object is not in use by another user and allows synchronous updates to be incorporated in the user interface object (i.e., updates are made real time). In another embodiment, multiple touch selection control program 200 determines the user interface object is already in use by another user, and updates are made asynchronously (i.e., updates are made offline to be merged at a later time). Multiple touch selection control program 200 creates a beta version of the user interface object within the user workspace. The beta version is an exact copy (e.g., clone) of the original user interface object that multiple touch selection control program 200 replicates and stores locally within the user workspace (e.g., changes are made locally within the beta version and are not incorporated within the original user interface object until merged). Through the creation of beta versions, multiple touch selection control program 200 allows more than one user to work simultaneously with a previously selected user interface object. However, as multiple touch selection control program 200 stores the beta versions locally within the user workspace, changes incorporated by the individual users do no effect the other users (e.g., users perform updates independent of one another). Multiple touch selection control program 200 also maintains the trajectory line connecting the user workspace with the user interface object, but updates the trajectory line (e.g., changes line transparency, color intensity, type of line style, etc.) thus indicating the user interface object is in use. Multiple touch selection control program 200 maintains the trajectory line for each user accessing the user interface object until multiple touch selection control program 200 receives another release command associated with the selected interface object such as exit, merge, or cancel.

As depicted in the example of FIG. 3A, through multiple touch selection control program 200, the user of user C workspace 320 selects to work with object 330 as identified by aiming tool 324 and trajectory line 328. Upon the release of aiming tool 324, multiple touch selection control program 200 retrieves a copy of object 330 thus creating beta object 332, which is placed within user C workspace 320 as depicted in the example of FIG. 3B. As multiple touch selection control program 200 identifies only one user, and updates are made to beta object 332, multiple touch selection control program 200 synchronizes beta object 332 with object 330 (e.g., updates are incorporated in object 326 as the updates occur in beta object 332). To indicate object 330 is in use, multiple touch selection control program 200 continues to display trajectory line 328, but as depicted in the example of FIG. 3B, trajectory line 328 becomes semi-transparent. Multiple touch selection control program 200 thus provides other future users with a visual queue indicating object 330 is in use by the user of user C workspace 320. In another example, when multiple touch selection control program 200 determines more than one user is accessing object 326 (e.g., a trajectory line exists previously connecting object 326 to another user workspace), multiple touch selection control program 200 changes from synchronous updates to asynchronous updates. Multiple touch selection control program 200 then creates the beta object (e.g., beta object 332, additional copies of object 326 not shown) within the user workspace of each additional user that is accessing object 326. Multiple touch selection control program 200 then stores updates locally in beta object 332 until multiple touch selection control program 200 receives another release command (e.g., exit, cancel, merge, etc.).

In yet another embodiment, multiple touch selection control program 200 receives an indication to cancel. Multiple touch selection control program 200 returns the aiming tool to an unselected state and removes the trajectory line from the display. In yet some other embodiment, multiple touch selection control program 200 receives an indication to delete an object. Multiple touch selection control program 200 removes the user interface object and the trajectory line from the GUI and returns the aiming tool to an unselected position.

Figure 4:
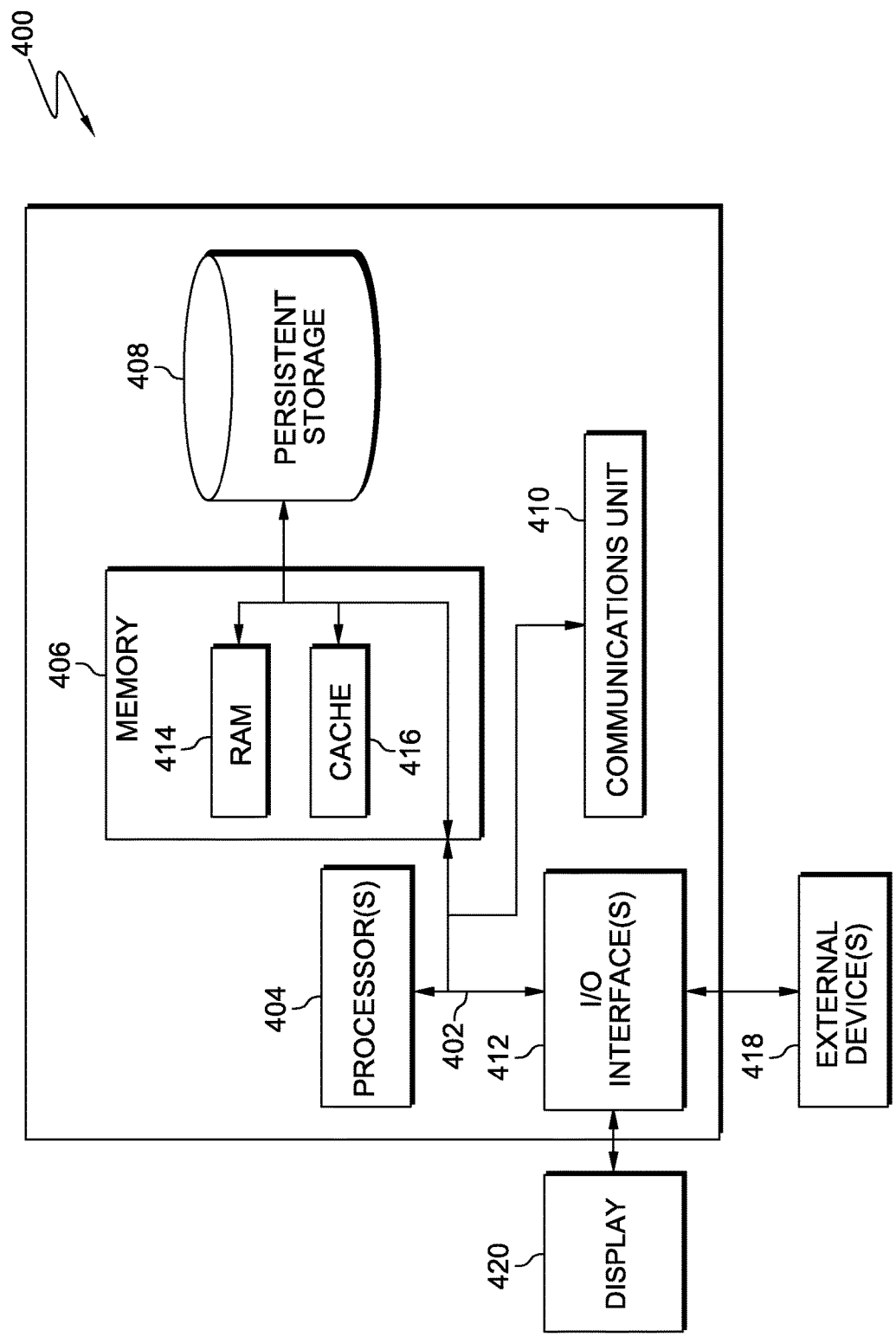
FIG. 4 is a block diagram of components of the touch-sensitive computing environment executing the multiple touch selection control program, in accordance with an embodiment of the present invention.

FIG. 4 depicts a block diagram of components of touch-sensitive computing environment 400, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Touch-sensitive computing environment 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

User interfaces 112, 114, and 116, and multiple touch selection control program 200 can be stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of enterprise grid and client devices. In these examples, communications unit 410 includes one or more network interface cards. Communications unit 410 may provide communications through the use of either or both physical and wireless communications links. User interfaces 112, 114, and 116, and multiple touch selection control program 200 may be downloaded to persistent storage 408 through communications unit 410.

I/O interface(s) 412 allows for input and output of data with other devices that may be connected to touch-sensitive computing environment 400. For example, I/O interface 412 may provide a connection to external devices 418, such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., user interfaces 112, 114, and 116, and multiple touch selection control program 200, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing a user interface, the method comprising:
   identifying, by one or more computer processors, a first user that is utilizing the user interface;
   determining, by one or more computer processors, the identified first user is utilizing an aiming tool that is a displayed user interface object utilized by the identified first user to select and perform actions with a second user interface object that is out of reach of the identified first user;

receiving, by one or more computer processors, an input, the input including at least: an orientation of the aiming tool, wherein the orientation includes a direction and a force to be applied upon release of the aiming tool wherein the force is a deformation of the aiming tool based on an identified number of received finger taps associated with the aiming tool;

calculating, by one or more computer processors, a trajectory from the aiming tool to a first location on the user interface based on the received input;

displaying, by one or more computer processors, the calculated trajectory from the aiming tool to the first location on the user interface as a unique color and a line style associated with the first user, wherein the location comprises one of: a blank space and a user interface object;

receiving, by one or more computer processors, a release command, wherein the release command includes a merge command, wherein the merge command incorporates a beta version within the user interface object; and performing, by one or more computer processors, the received release command.

2. The method of claim 1, further comprising:
assigning, by one or more computer processors, the first user a workspace, wherein the workspace identifies at least a portion of the user interface dedicated to the first user and the workspace includes the aiming tool and assigning, by one or more computer processors, a unique color and a line style to the aiming tool associated with the assigned workspace associated with the first user.

3. The method of claim 1, further comprising:
displaying, by one or more computer processors, the calculated trajectory from the aiming tool to the first location on the user interface as a unique color and a line style associated with the first user, wherein a location comprises one of: a blank space and a user interface object;

receiving, by one or more computer processors, an update to the input, wherein the update includes changes to at least the orientation of the aiming tool;

calculating, by one or more computer processors, an updated trajectory from the aiming tool to a second location on the user interface based on the received update to the input; and displaying, by one or more computer processors, the calculated updated trajectory from the aiming tool to the second location on the user interface.

4. The method of claim 1, wherein performing the received release command further comprises:
determining, by one or more computer processors, that the first location includes a user interface object selected by a second user;

creating, by one or more computer processors, the beta version of the user interface object selected by the first user in a workspace associated with the first user;

receiving, by one or more computer processors, one or more updates performed by the first user to the beta version; and storing, by one or more computer processors, the received one or more updates performed by the first user to the beta version within the workspace associated with the first user.

5. The method of claim 1, wherein performing the received release command further comprises:

determining, by one or more computer processors, that the first location includes a user interface object that is not selected by a second user;

creating, by one or more computer processors, the beta version of the user interface object in a workspace associated with the first user;

receiving, by one or more computer processors, one or more updates performed by the first user to the beta version; and storing, by one or more computer processors, the received one or more updates performed by the first user to the beta version within one or more of the workspace associated with the first user and the determined location.

6. The method of claim 1, wherein the user interface operates on a touchscreen device that includes a touch wall.

7. A computer program product for managing a user interface, the computer program product comprising:
one or more computer readable storage media and program instructions stored on the one or more computer readable storage media, the program instructions comprising:

program instructions to identify a first user that is utilizing the user interface;

program instructions to determine the identified first user is utilizing an aiming tool that is a displayed user interface object utilized by the identified first user to select and perform actions with a second user interface object that is out of reach of the identified first user;

program instructions to receive an input, the input including at least: an orientation of the aiming tool, wherein the orientation includes a direction and a force to be applied upon release of the aiming tool wherein the force is a deformation of the aiming tool based on an identified number of received finger taps associated with the aiming tool;

program instructions to calculate a trajectory from the aiming tool to a first location on the user interface based on the received input;

display the calculated trajectory from the aiming tool to the first location on the user interface as a unique color and a line style associated with the first user, wherein the location comprises one of: a blank space and a user interface object;

receive a release command, wherein the release command includes a merge command, wherein the merge command incorporates a beta version within the user interface object; and perform the received release command.

8. The computer program product of claim 7, further comprising program instructions, stored on the one or more computer readable storage media, to:
assign the first user a workspace, wherein the workspace identifies at least a portion of the user interface dedicated to the first user and the workspace includes the aiming tool and assign a unique color and a line style to the aiming tool associated with the assigned workspace associated with the first user.

9. The computer program product of claim 7, further comprising program instructions, stored on the one or more computer readable storage media, to:
display the calculated trajectory from the aiming tool to the first location on the user interface as a unique color and a line style associated with the first user, wherein a location comprises one of: a blank space and a user interface object;

receive an update to the input, wherein the update includes changes to at least the orientation of the aiming tool;

calculate an updated trajectory from the aiming tool to a second location on the user interface based on the received update to the input; and display the calculated updated trajectory from the aiming tool to the second location on the user interface.

10. The computer program product of claim 7, wherein performing the received release command further comprises program instructions, stored on the one or more computer readable storage media, to:

determine that the first location includes a user interface object selected by a second user;

create the beta version of the user interface object selected by the first user in a workspace associated with the first user;

receive one or more updates performed by the first user to the beta version; and store the received one or more updates performed by the first user to the beta version within the workspace associated with the first user.

11. The computer program product of claim 7, wherein performing the received release command further comprises program instructions, stored on the one or more computer readable storage media, to:

determine that the first location includes a user interface object that is not selected by a second user;

create the beta version of the user interface object in a workspace associated with the first user;

receive one or more updates performed by the first user to the beta version; and store the received one or more updates performed by the first user to the beta version within one or more of the workspace associated with the first user and the determined location.

12. The computer program product of claim 7, wherein the user interface operates on a touchscreen device that includes a touch wall.

13. A computer system for managing a user interface, the computer system comprising:

one or more computer processors, one or more computer readable storage media, and program instructions stored on the computer readable storage media for execution by at least one of the one or more processors, the program instructions comprising:

program instructions to identify a first user that is utilizing the user interface;

program instructions to determine the identified first user is utilizing an aiming tool that is a displayed user interface object utilized by the identified first user to select and perform actions with a second user interface object that is out of reach of the identified first user;

program instructions to receive an input, the input including at least: an orientation of the aiming tool, wherein the orientation includes a direction and a force to be applied upon release of the aiming tool wherein the force is a deformation of the aiming tool based on an identified number of received finger taps associated with the aiming tool;

program instructions to calculate a trajectory from the aiming tool to a first location on the user interface based on the received input;

display the calculated trajectory from the aiming tool to the first location on the user interface as a unique color and a line style associated with the first user, wherein the location comprises one of: a blank space and a user interface object;

receive a release command, wherein the release command includes a merge command, wherein the merge command incorporates a beta version within the user interface object; and perform the received release command.

14. The computer system of claim 13, further comprising program instructions, stored on the one or more computer readable storage media, to:

assign the first user a workspace, wherein the workspace identifies at least a portion of the user interface dedicated to the first user and the workspace includes the aiming tool and assign a unique color and a line style to the aiming tool associated with the assigned workspace associated with the first user.

15. The computer system of claim 13, further comprising program instructions, stored on the one or more computer readable storage media, to:

display the calculated trajectory from the aiming tool to the first location on the user interface as a unique color and a line style associated with the first user, wherein a location comprises one of: a blank space and a user interface object;

receive an update to the input, wherein the update includes changes to at least the orientation of the aiming tool;

calculate an updated trajectory from the aiming tool to a second location on the user interface based on the received update to the input; and display the calculated updated trajectory from the aiming tool to the second location on the user interface.

16. The computer system of claim 13, wherein performing the received release command further comprises program instructions, stored on the one or more computer readable storage media, to:

determine that the first location includes a user interface object selected by a second user;

create the beta version of the user interface object selected by the first user in a workspace associated with the first user;

receive one or more updates performed by the first user to the beta version; and store the received one or more updates performed by the first user to the beta version within the workspace associated with the first user.

17. The computer system of claim 13, wherein performing the received release command further comprises program instructions, stored on the one or more computer readable storage media, to:

determine that the first location includes a user interface object that is not selected by a second user;

create the beta version of the user interface object in a workspace associated with the first user;

receive one or more updates performed by the first user to the beta version; and store the received one or more updates performed by the first user to the beta version within one or more of the workspace associated with the first user and the determined location.

* * * * *